(12) United States Patent
Thrap

(10) Patent No.: US 7,170,260 B2
(45) Date of Patent: Jan. 30, 2007

(54) RAPID CHARGER FOR ULTRACAPACITORS

(75) Inventor: Guy C. Thrap, Del Mar, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 181 days.

(21) Appl. No.: 10/611,420

(22) Filed: Jun. 30, 2003

(65) Prior Publication Data

US 2004/0263129 A1    Dec. 30, 2004

(51) Int. Cl.
*H01M 10/44* (2006.01)
*H01M 10/46* (2006.01)

(52) U.S. Cl. ................................ 320/166

(58) Field of Classification Search .......... 320/167, 320/166, 139, 140, 141, 148, 128, 129, 145, 320/1, 20, 39, 44; 323/282, 285, 222, 271, 323/290
See application file for complete search history.

(56) References Cited

U.S. PATENT DOCUMENTS

| | | | | |
|---|---|---|---|---|
| 5,519,307 A | * | 5/1996 | Moon | 323/222 |
| 5,604,426 A | * | 2/1997 | Okamura et al. | 323/282 |
| 5,621,607 A | | 4/1997 | Farahmandi et al. | |
| 5,642,027 A | * | 6/1997 | Windes et al. | 320/166 |
| 5,777,428 A | | 7/1998 | Farahmandi et al. | |
| 5,862,035 A | | 1/1999 | Farahmandi et al. | |
| 5,907,472 A | | 5/1999 | Farahmandi et al. | |
| 6,059,847 A | | 5/2000 | Farahmandi et al. | |
| 6,094,788 A | | 8/2000 | Farahmandi et al. | |
| 6,233,135 B1 | | 5/2001 | Farahmandi et al. | |
| 6,621,256 B2 | * | 9/2003 | Muratov et al. | 323/282 |

* cited by examiner

*Primary Examiner*—Edward H. Tso
(74) *Attorney, Agent, or Firm*—Hensley Kim & Edgington, LLC

(57) ABSTRACT

A rapid charging circuit for charging a power module is disclosed. The power module includes one or more ultracapacitors. The power module is charged using an energy source connected to the power module. The charging circuit includes a control circuit adapted to maintain a constant power level at the power module during charging as the voltage level across the power module increases. The control circuit includes a pulse-width modulator and an inductor connected in series with the power module. The pulse-width modulator can control a charge level of the inductor. The charge level may correspond to a current level which is in accordance with a desired power level at the power module and an instantaneous voltage level across the power module. The inductor may be adapted to limit a current level through the power module to a predetermined peak level. The control circuit may be adapted to provide a current level through the power module greater than a current level from said energy source during at least a portion of a charging period.

12 Claims, 5 Drawing Sheets

RAPID CHARGER FOR ULTRACAPACITORS

FIELD OF THE INVENTION

The present invention relates generally to energy storage systems. More particularly, the invention relates to methods and systems for charging energy storage systems which incorporate ultracapacitors.

BACKGROUND

The following description is provided to assist the understanding of the reader. None of the information provided or references cited is admitted to be prior art to the present invention.

Ultracapacitors can be an excellent source of energy in many applications. They offer several advantages over other types of energy storage systems such as batteries. For example, once depleted, ultracapacitors can be recharged at a significantly faster rate than batteries. Under ideal conditions, the recharge rate can be as high as the discharge rate.

Existing recharges for ultracapacitors generally provide a constant current through the ultracapacitor to provide recharging energy. Although this provides a constant recharge rate, the rate is limited by the output current of the recharging energy source. For example, an energy source for recharging may be a 50-volt, 20-ampere, direct current source. The recharging current is limited to the 20-ampere current from the source.

Thus, the time to recharge the ultracapacitor to 100% of capacity is dictated by the output current level of the source. In many circumstances, it would be desirable to achieve a recharge rate greater than that achieved at the current level of the energy source.

SUMMARY OF THE INVENTION

The disclosed embodiments of the present invention provide systems and methods for recharging an ultracapacitor at a faster rate than allowed by the constant-current configuration described above. Thus, a faster recharging of a depleted ultracapaictor can be achieved.

In one aspect, the invention provides an arrangement for charging a power module. The arrangement includes a power module with one or more ultracapacitors and an energy source connected to the power module. A positive terminal of the energy source is connected to a positive terminal of the power module, and a negative terminal of the energy source is connected to a negative terminal of the power module. A control circuit is adapted to maintain a constant power level at the power module as the voltage level across the power module increases.

A "power module" may be a bank of ultracapacitors, such as twenty-two 2700-farad ultracapacitors connected in series. The power module may be implemented as a rack-mountable package containing the bank of ultracapacitors.

"Ultracapacitors" are well-known to those skilled in the art. Ultracapacitors generally include two current collecting plates, each having a corresponding electrode and being separated by a separator. Energy is stored in the form of a charge at the separated electrodes. For more detail on ultracapacitors, reference may be made to U.S. Pat. Nos. 5,621,607, 5,777,428, 5,862,035, 5,907,472, 6,059,847, 6,094,788 and 6,233,135, each of which is hereby incorporated by reference in its entirety.

In one embodiment, the control circuit includes a pulse-width modulator and an inductor connected in series with the power module. The pulse-width modulator can control a charge level of the inductor. The charge level may correspond to a current level which is in accordance with a desired power level at the power module and an instantaneous voltage level across the power module. The inductor may be adapted to limit a current level through the power module to a predetermined peak level.

In one embodiment, the control circuit is adapted to provide a current level through the power module greater than a current level from said energy source during at least a portion of a charging period.

In another aspect, the invention provides a constant-power charging circuit for an ultracapacitor power module. The circuit includes a pulse-width modulator and an inductor connected in series with the pulse-width modulator the said power module. The pulse-width modulator is adapted to control the charge level of the inductor.

In another aspect, the invention includes a method of charging an ultracapacitor power module. The method includes charging an inductor connected in series between an energy source and the power module. The charge level of the inductor is controlled to achieve a desired current level through the power module.

In one embodiment, the controlling includes modulating the current from the energy source to the inductor through a pulse-width modulator.

The desired current level may correspond to a desired power level at the power module. The power level may be constant during charging of the power module.

While aspects and embodiments of the present invention are described herein, it would be understood that such descriptions are exemplary of uses and aspects of the presently described charging systems and methods and should not be limiting in content.

DETAILED DESCRIPTION

The present invention is generally directed to rapid charging systems and methods for recharging ultracapacitor power modules. In this regard, the present invention allows the rapid charging of ultracapacitors, thereby significantly reducing the time required for recharging, for example, a bank of ultracapacitors.

Ultracapacitors are well known to those skilled in the art as an efficient energy storage system. Ultracapacitor power modules can include a bank of ultracapacitors connected in series to provide a desired voltage level for the particular application. One attractive feature of ultracapacitors as an energy source is the relatively short recharge times once the ultracapacitors are completely or partially depleted.

The recharge rate of a capacitor, an ultracapacitor or a bank of ultracapacitors in a power module can be described by the following equation:

$$dV/dt = I/C,$$

where dV/dt is the rate of increase of voltage in the ultracapacitor, I is the current through the ultracapacitor, and C is the capacitance of the ultracapacitor.

Figure 1A:
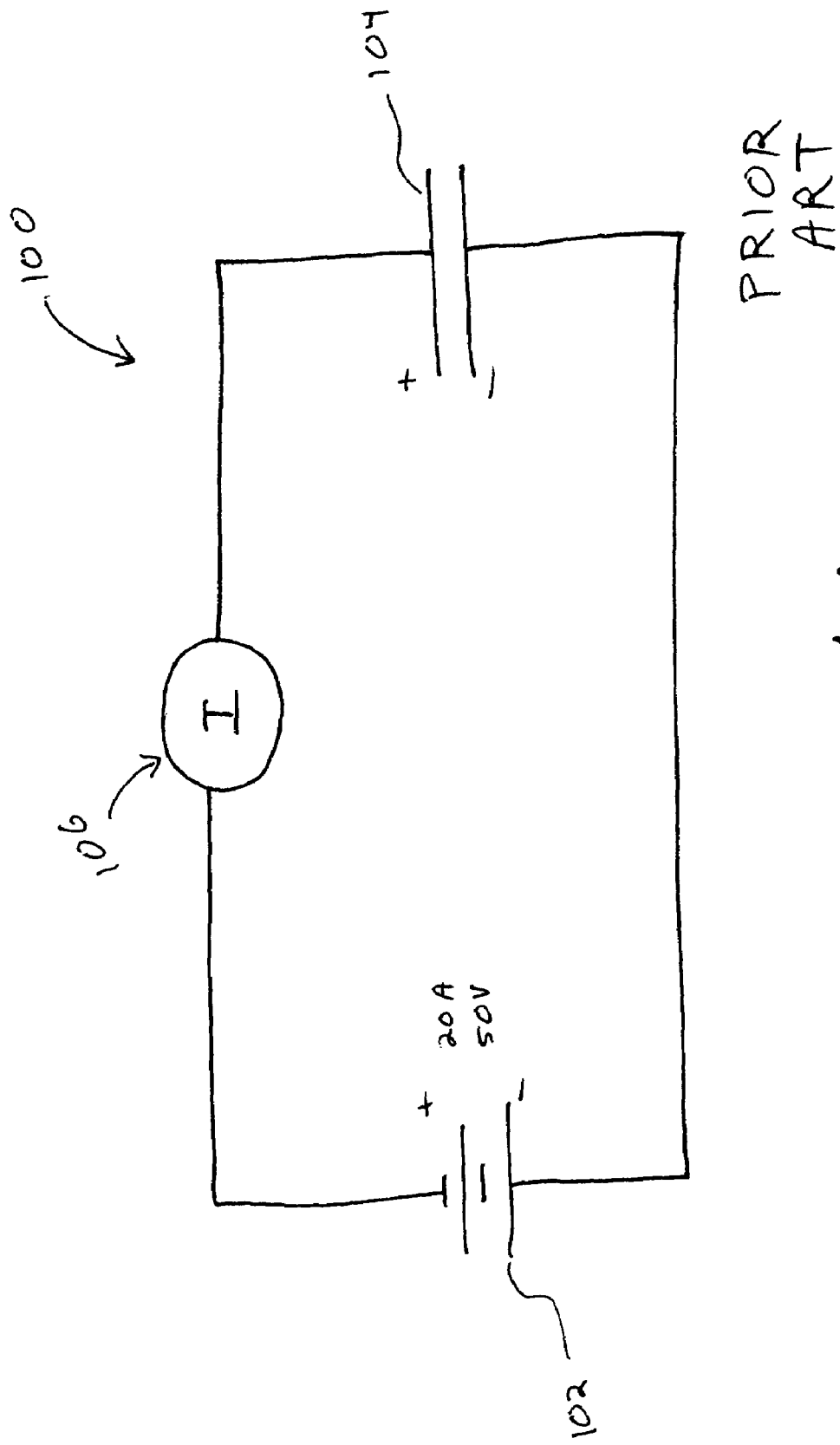
FIG. 1A is a schematic illustration of a prior-art, constant-current charging circuit.

As described above, present charging circuits use a constant current configuration, as illustrated schematically in FIG. 1A. In this arrangement, an energy source 102 is provided for recharging a power module 104. In this regard, the positive terminal of the source 102 is connected to the positive terminal of the power module 104, and the negative terminal of the source 102 is connected to the negative terminal of the power module 104.

Figure 1B:
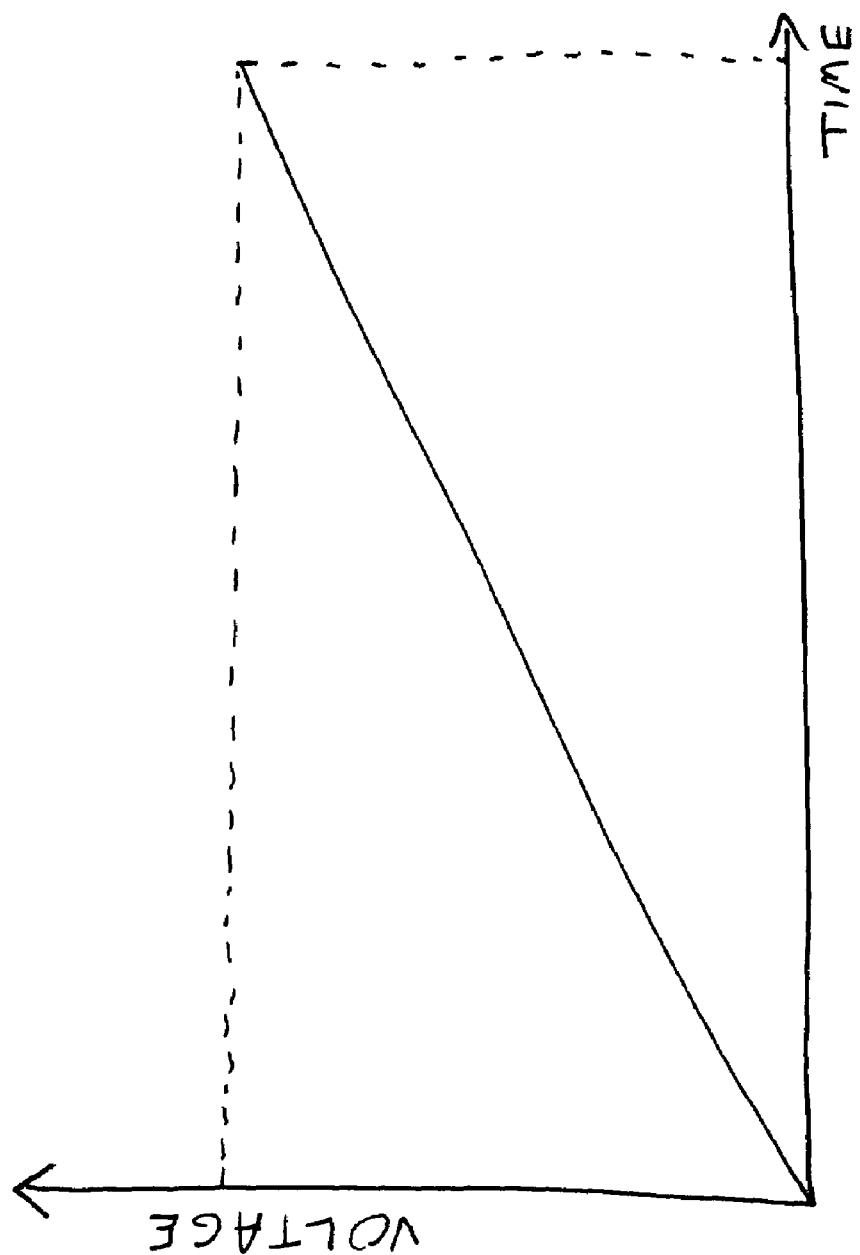
FIG. 1B is a chart illustrating the charge profile for an ultracapacitor power module using the charging circuit of FIG. 1A.

A constant-current circuit 106 is provided to regulate the current being supplied to the power module 104. In this regard, the power module 104 receives a constant current, typically equal to the output current of the source 102. Referring to the equation above, with a constant current, I, and a constant capacitance of the power module 104, it is apparent that the charge rate, dV/dt is also constant. An exemplary charge profile for this arrangement is illustrated in FIG. 1B.

Figure 2A:
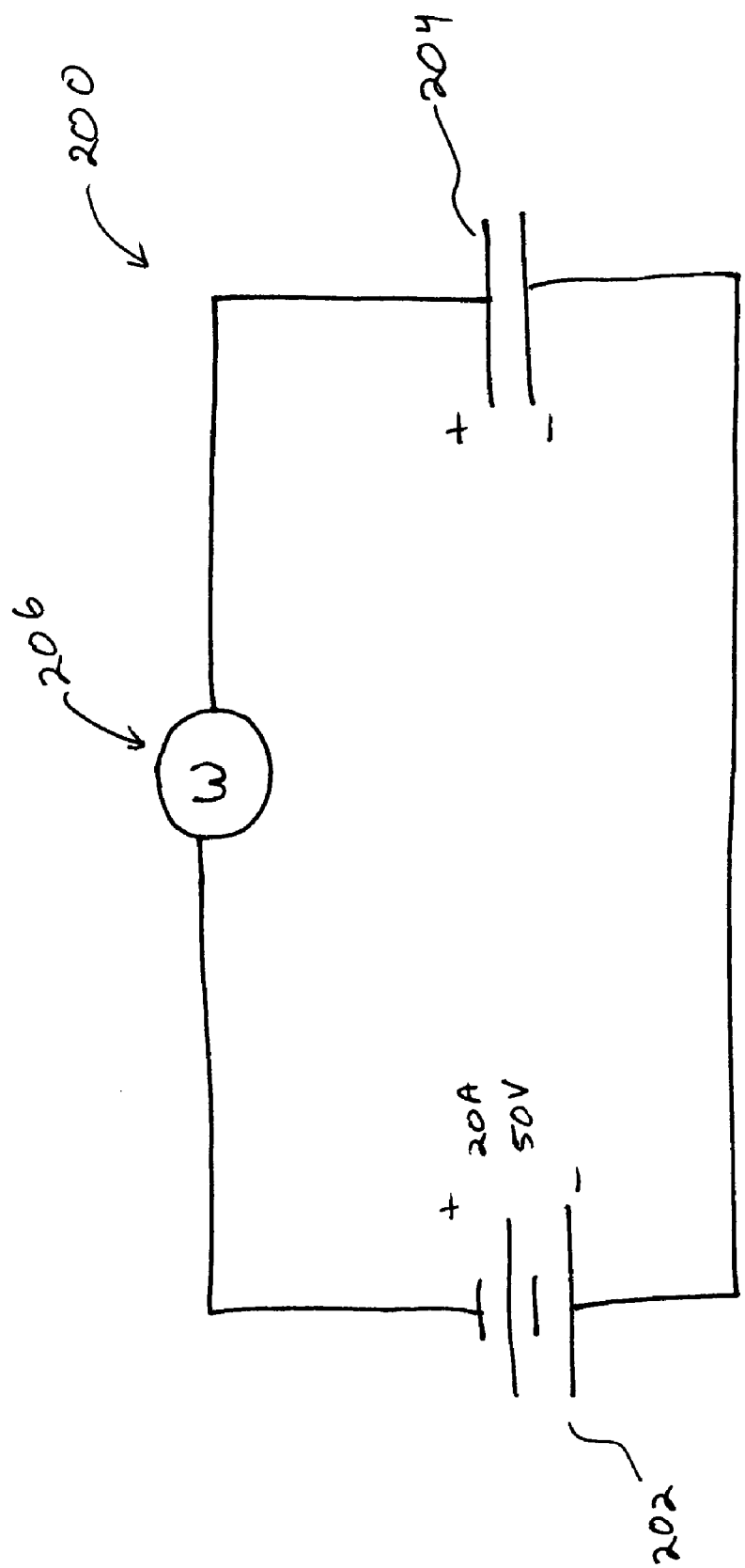
FIG. 2A is a schematic illustration of an embodiment of a constant-power charging circuit according to the present invention.
Figure 2B:
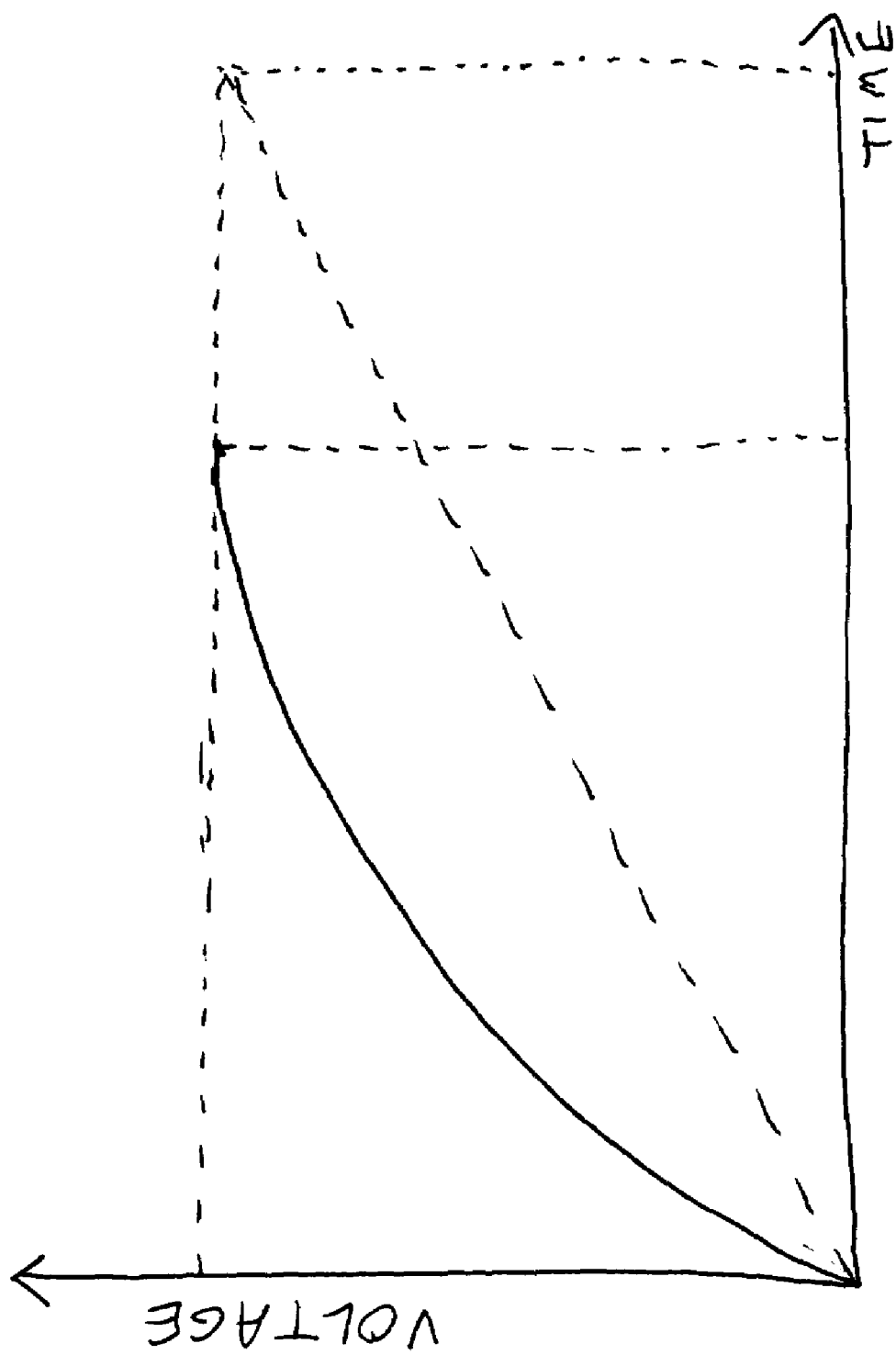
FIG. 2B is a chart illustrating the charge profile for an ultracapacitor power module using the charging circuit of FIG. 2A.

In order to improve the charge rate, the current through the power module should be increased. According to one embodiment of the present invention, a circuit to provide a constant power to the power module achieves this goal. FIGS. 2A and 2B illustrate one such embodiment. The arrangement 200 includes an energy source 202 for recharging an ultracapacitor power module 204. The positive terminal of the energy source 202 is connected to the positive terminal of the power module 204, and the negative terminal of the energy source 202 is connected to the negative terminal of the power module 204.

The energy source 202 may be, for example, a battery or other power source. In one embodiment, the energy source 202 includes an AC power grid with a DC converter to provide direct current. In the illustrated embodiment, the energy source 202 is a 20-ampere, 50-volt power source. It will be understood by those skilled in the art that the size of the energy source may vary according to requirements.

The ultracapacitor power module 204 may be a single ultracapacitor or a bank of ultracapacitors connected in series, for example. In one embodiment, the power module includes a bank of twenty-two 2700-farad ultracapacitors connected in series. The power module 204 typically has a rated voltage when the power module 204 is fully charged.

A constant-power circuit 206 provides a constant power to the power module 204. As is well known to those skilled in the art, power is the product of current and voltage. Thus, when the power module 204 is substantially depleted (i.e., has a low voltage), the current level is relatively high if the power is constant. Thus, as illustrated in FIG. 2B, at the lower voltage area, the constant-power charging provides a significantly more rapid recharging than the constant-current charging.

Figure 3:
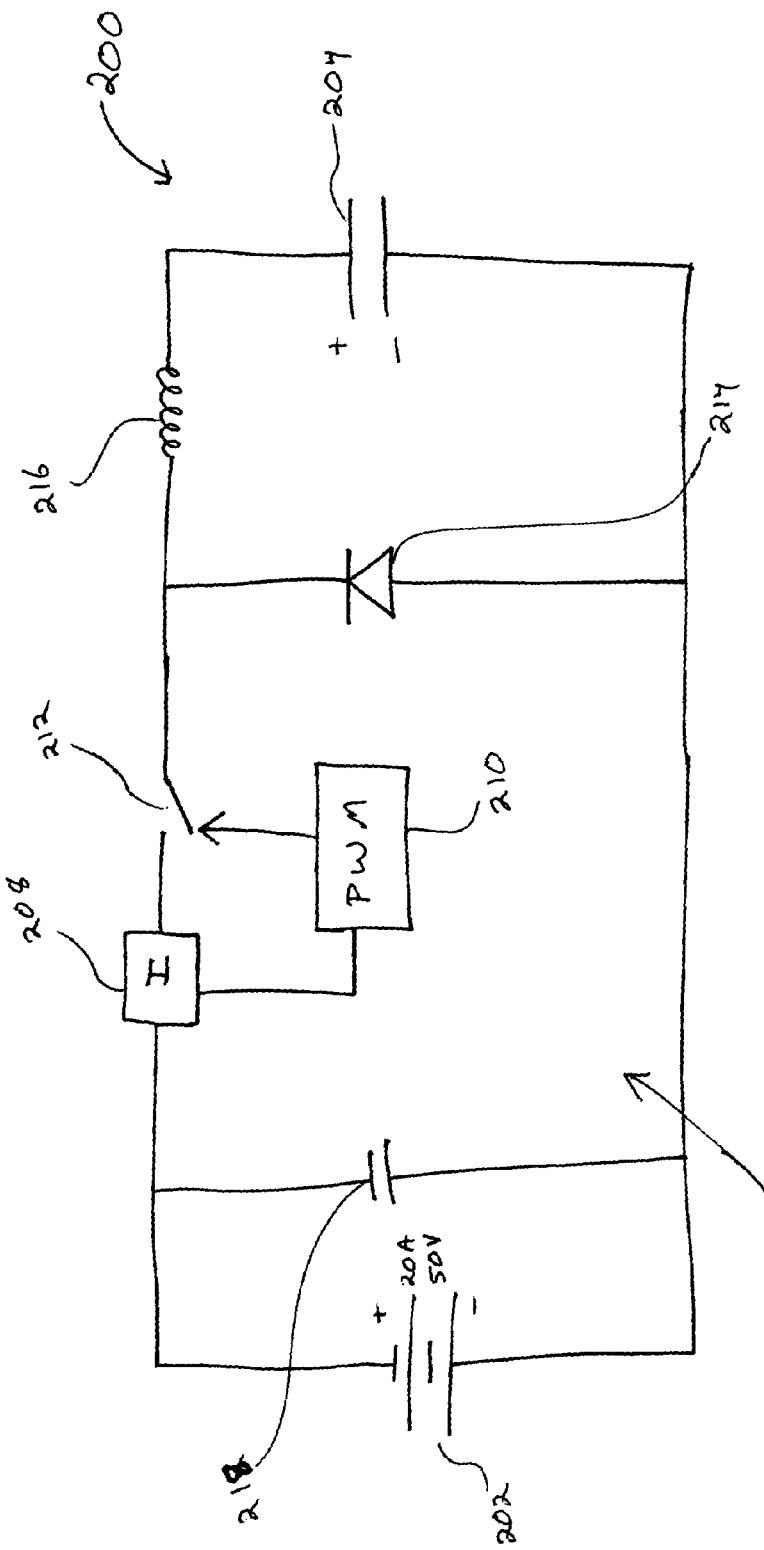
FIG. 3 illustrates, in detail, one embodiment of a constant-power charging circuit illustrated in FIG. 2A.

FIG. 3 provides a schematic illustration of one embodiment of a constant-power charging circuit 206. In this embodiment, the charging circuit 206 includes a current measuring device 208 which provides an input to a pulse-width modulator 210. Current measuring or detection devices 208 are well-known to those skilled in the art, as are pulse-width modulators, which are also known as pulse-duration modulators. The pulse-width modulator 210 actuates a switch 212 through which the pulse-width modulator allows pulses of current to pass. The width of the pulses can be modulated to provide a current profile associated with a desired power level for the power module.

A capacitor 218 is provided just across the input from the source 202. The capacitor 218 is preferably capable of storing a small amount of energy, and should be sized to achieve the desired output result. The capacitor 218 serves to protect the source 202 from experiencing fluctuations during operation of the pulse-width modulator 210.

An inductor 216 is provided in series with the power module 204. Preferably, the inductor is sized to minimize the voltage dissipated. The inductor 216 serves to provide an average current through the power module 204 while the pulse-width modulator 210 is operating, as described below.

In operation, the inductor 216 is first charged to a current level associated with the instantaneous voltage level across the power module 204 and the desired constant-power level. For example, if the present voltage across the power module 204 is 40 volts and the desired constant-power level is 1000 watts, the inductor 216 is charged to a peak current of 25 amperes.

In many cases, the initial voltage across the power module 204 may be very low or zero. In this case, the constant-power level dictates an extremely high peak current level. Such a level may be dangerous to certain components in the system. To protect such components, the peak current level may be limited to a pre-selected level, such as 50 amperes. Thus, for a constant-power level of 1000 watts, the inductor may be charged to a level of 50 amperes until the voltage across the power module 204 reaches 20 volts.

The pulse-width modulator 210 opens and closes the switch 212 to control the charge level of the inductor 216 and, therefore, control the current level through the power module 204. When the switch 212 is closed, energy from the source 202 is directed to the inductor 216, thereby charging the inductor 216. When the switch 212 is open, the charge level of the inductor 216 decline from a peak current level.

The operation of the pulse-width modulator 210 thus provides a peak current level which may be limited to, for example, 50 amperes in the illustrated example. Depletion of energy from the inductor allows a peak current greater than the source current.

As the voltage level across the power module 204 increases, the pulse-width modulator 210 can reduce the current level through the power module 204 by decreasing the charge level of the inductor 216.

Thus, at the start of the charging, the inductor may be provided with a high current-level charge. The high level may be maintained by the pulse-width modulator by providing energy from the source 202. As the voltage level across the power module 204 increase, a lower current level through the power module 204 is desired. To this effect, the pulse-width modulator 210 provides less energy from the source 202 to the inductor 216, causing the charge level of the inductor to decrease.

The ratio of capacitor charging voltage to the source voltage sets the duty cycle for the pulse-width modulator. The result is increased charge current into the power module 204 and reduced charging time. For example, if the source is 50V and the voltage across the power module 204 is 25V, the pulse-width modulator operates at a 50%-duty cycle. In this example, the inductor will charge to 40A for 50% of the time to draw 20A from the source. The 40A will flow into the power module 204.

The current profile resulting from the operation of the pulse-width modulator 210 is a series of current pulses. In one embodiment, the pulse-width modulator 210 operates at a frequency of 50 KHz. Thus, the pulses of current are between zero and 20 milliseconds in duration. The overall average from the pulses is equal to the current from the source, or 20 amperes in the illustrated example. The current at the outset may be substantially greater that the source current, while the later current may be substantially lower when the voltage across the power module is relatively high.

A diode 214 is provided across the power module 204. The diode 214 prevents unintentional discharge of the power module 204. The diode 214 prevents backflow of the current, as may occur when the switch 212 is opened.

It will be understood by those skilled in the art that, although the preferred embodiment employs a constant-power charging profile, other embodiments may not include such a profile. For example, some embodiments may provide a current at the earlier stages of recharging that is at a higher level than the source current. The current level may drop in the later stages, but without maintaining a constant-power profile.

Thus, the disclosed embodiments of the invention provide a system and method for charging an ultracapacitor module at a higher current than the source current, thereby reducing the recharging time.

While preferred embodiments and methods have been shown and described, it will be apparent to one of ordinary skill in the art that numerous alterations may be made without departing from the spirit or scope of the invention. Therefore, the invention is not limited except in accordance with the following claims.

I claim:

1. An arrangement for charging a power module, comprising:
   a power module including one or more ultracapacitors;
   an energy source connected to said power module, a positive terminal of said energy source connected to a positive terminal of said power module, and a negative terminal of said energy source connected to a negative terminal of said power module; and
   a control circuit adapted to provide a current level to said power module greater than a current level from said energy source during at least a portion of a charging period, wherein said control circuit is adapted to maintain a constant power level at the power module during at least a portion of the charging period as a voltage level across the power module increases.

2. The arrangement according to claim 1, wherein said control circuit includes pulse-width modulator and an inductor connected in series with said power module.

3. The arrangement according to claim 2, wherein said pulse-width modulator controls a charge level of said inductor.

4. The arrangement according to claim 3, wherein said charge level corresponds to a current level which is in accordance with a desired power level at said power module and an instantaneous voltage level across said power module.

5. The arrangement according to claim 2, wherein said inductor is adapted to limit a current level through said power module to a predetermined peak level.

6. A constant-power charging circuit for an ultracapacitor power module, comprising:
   a pulse-width modulator; and
   an inductor connected in series with said pulse-width modulator and said power module;
   wherein said pulse-width modulator is adapted to control the charge level of said inductor, and wherein a control circuit is adapted to provide a current level through said power module greater than a current level from an energy source during at least a portion of a charging period.

7. The circuit according to claim 6, wherein said charge level corresponds to a current level which is in accordance with a desired power level at said power module and an instantaneous voltage level across said power module.

8. The arrangement according to claim 6, wherein said inductor is adapted to limit a current level through said power module to a predetermined peak level.

9. The arrangement according to claim 6, wherein said control circuit is adapted to provide a current level through said power module greater than a current level from said energy source during at least a portion of a charging period.

10. A method of charging an ultracapacitor power module, comprising:
    charging an inductor connected in series between an energy source and said power module; and
    controlling a charge level of said inductor to achieve a desired current level through said power module, said desired current level through said power module being greater than a current level from said energy source during at least a portion of a charging period, wherein a power level to said power module is kept constant during at least a portion of a charging period of said power module.

11. The method according to claim 10, wherein said controlling includes modulating the current from said energy source to said inductor through a pulse-width modulator.

12. The method according to claim 10, wherein said desired current level corresponds to a desired power level at said power module.

* * * * *